Patented Nov. 20, 1923.

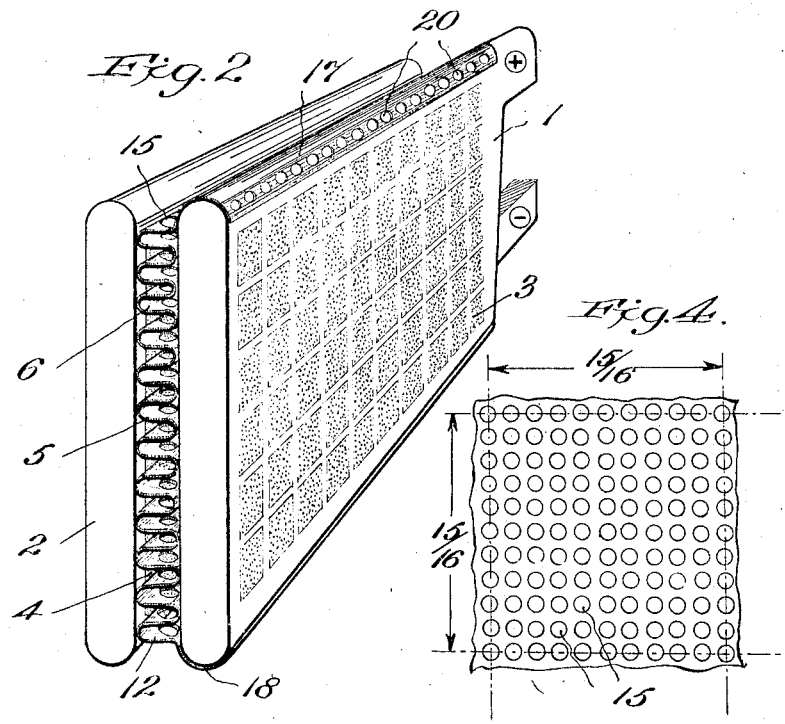

1,474,761

UNITED STATES PATENT OFFICE.

THOMAS A. CAMPBELL, OF NEW YORK, N. Y., JOHN W. DAMON, OF PLYMOUTH, MASSACHUSETTS, AND AUSTIN B. STEWART, OF NEWARK, NEW JERSEY, ASSIGNORS TO THOMAS A. CAMPBELL, TRUSTEE, OF NEW YORK, N. Y.

SECONDARY CELL AND SEPARATOR PLATE FOR USE THEREIN.

Application filed November 30, 1920. Serial No. 427,362.

*To all whom it may concern:*

Be it known that we, THOMAS A. CAMPBELL, JOHN W. DAMON, and AUSTIN B. STEWART, all citizens of the United States of America, residing in the borough of Manhattan, city, county, and State of New York, in the town of Plymouth, State of Massachusetts, and in Newark, county of Essex, and State of New Jersey, respectively, have invented certain new and useful Improvements in Secondary Cells and Separator Plates for Use Therein, of which the following is a specification.

This invention relates to secondary cells or batteries, and separators used therein, and aims to provide improvements therein.

The present invention provides a cell of great mechanical strength, capable of a heavy discharge, having a minimum fall of voltage, even on heavy discharge, and having long life. The cell, consequently, has a high watt-hour, ampere-hour, and voltage efficiency.

The invention further provides an improved separator, the use of which renders the assembling of the parts of the cell more facile, and which, in use in the cell, contributes to the advantages of the cell referred to above.

Other features of the invention will be set forth in connection with the following detailed description. Two embodiments of the invention are illustrated in the accompanying drawings;—wherein Figure 1 is a perspective view of one embodiment of the separator;

Fig. 2 is a perspective view of two battery or cell plates, of the "paste" variety, and a separator, showing the co-relation between the parts;

Fig. 3 is a perspective view of a second embodiment of the separator plate;

Fig. 4 is a view, on an enlarged scale, of a sheet of material from which the separator is formed;

Fig. 5 is an end view (also on an enlarged scale) of a part of a separator made from the sheet illustrated in Fig. 4.

In said drawings, numerals 1 and 2 designate two plates of a secondary cell, one of which may be "positive," and the other of which is "negative." The plates may be, as is usual in a so-called lead cell, of the "paste" variety, having cakes of lead oxid paste embedded in grids, as indicated at 3 and 4.

Numerals 5, $5^1$, designate the separator. The separator is conveniently made of a material which is a good di-electric or insulator, celluloid for example, such as is made for battery use.

The separator is made from a sheet of the insulating material, and corrugated, as at 6. The bends 7 of the corrugations are curved, as indicated at 9, Fig. 1, or angular, as indicated at 10, Fig. 3, whereby the bends have a contact, in the nature of a line, with the face of a cell plate. In this manner, little, if any, of the active surface of the plates 1, 2, is directly covered by the separator.

The portion 12 of the corrugations between the bends 7 are preferably somewhat long, and preferably parallel, so as to stand perpendicular to the faces of the cell plates, as shown in Fig. 2 in relation to the plates 1 and 2, and thereby resist, in a direct line, stresses transmitted from the face of said plates. This form of the separator gives to the separator, and the cell in which it is used, great mechanical strength. The heat generated upon the charging and discharging of a cell, and the consequent expansion and buckling of the plates, puts large strains on the separators. The parallel form of the parts 12 of the corrugations, together with the large number of lines of contact between the separator and plate, enables the separator to withstand being crushed or flattened (and consequent liability to short circuiting) and resists buckling of the plates, whereby warping thereof is prevented.

The separator is also provided with a multiplicity of perforations 15, and these perforations are preferably found in the parts 12 of the corrugations between the bends 7.

By thus locating the perforations between the bends, the bends are left smooth, and hence any slight movement which may occur between the bends of the separator and the face of the plate, due to expansion and contraction by temperature changes, does not result in the separator scraping off or dislodging the material of the plate. Moreover, the corrugations are preferably so arranged as to stand vertical, so that any dislodged material from the plate may fall therethrough to the wall at the bottom of the cell.

The electrical insulation of the plates, one from another, is good, inasmuch as the corrugated separator interposes a physical insulator or di-electric having a thickness in effect equal to the length of the corrugations. This is conducive to lowering the losses due to self-discharge in the cell, and hence renders the plate less liable to become covered with sulphate on long standing.

With storage cells previously made with separators, there has been found to be a fall of voltage, and a consequent limitation on the output of the cell, on heavy discharges, as in supplying current, on starting, to an automobile starting motor. In order to obviate this disadvantage in prior cells, we arrange the perforations 15 in such number and manner that the open area provided by the aggregate perforations in a unit area of separator is not less than, and conveniently about equal to, a corresponding unit area of plate surface. To give a concrete case, a flat piece of celluloid $\frac{15}{16}$ths inches square, (Fig. 4 which is drawn on a scale of 2 to 1) perforated with $\frac{1}{16}$th inch round holes in rows $\frac{3}{32}$nds apart on centers, has a total open area of $100 \times d^2 \times .7854$ (.00307) $= .307$. The corresponding area of the lead plate surface ($\frac{15}{16}$ths inches square) is $.878+$ square inches. Now, if a sheet of celluloid, perforated as described, be corrugated between the lines of perforations on lines $\frac{3}{32}$nds apart on the flat sheet so as to measure approximately $\frac{1}{16}$th inch from the center line of one corrugation to the center line of an adjacent corrugation (providing 30 parallel perforated parts 12, in a bracket $\frac{15}{16}$ths inches square—Fig. 5), there will be, in the area of said bracket, (corresponding to the $.878+$ square inches of plate surface) an open area of $.92+$ square inches. Therefore, in the corrugated sheet covering $.878+$ square inches, there will be an open area of greater magnitude, viz, $.92+$ square inches, thus providing, in the corrugated separator, more open space than the superficial area of one side of a plate having the same length and breadth. This relatively large open area in the separator permits of a good circulation of the electrolyte, thus enabling the heat generated in the cell, in charging and discharging, to be more readily dissipated, and the cell to be used at a relatively low average temperature.

The relatively large open area of the separator also permits of a greatly improved circulation or migrating movement of the ions, thereby lowering the internal resistance, which enables the cell to work more efficiently as to watt-hour output, ampere-hour output, and voltage, and especially allows of a maximum heavy discharge, an impoverishment or scarcity of ions being less likely to occur than with a separator plate having less open area than the area of the plate.

The separator is preferably formed with hooks 17, 18 at opposite sides, and facing in the same direction, so as to embrace the two opposite sides of one plate, as shown in Fig. 2. The separators 5, 5¹, are thereby easily attached to the plates, the corrugations admitting of lateral extension of the separators and the hooks 17, 18, being sprung over the sides of the plates. The units formed by a separator 5, 5¹, and plate are very conveniently assembled in a cell or battery. The hooks also serve as insulators for the sides of the plates, so that the plates at the sides are well insulated from one another. These hooks are preferably perforated, as indicated at 20, so as to admit of the sides of the plates serving as active parts of the plate.

The inventive ideas herein set forth may have other embodiment than that herein specifically illustrated and described.

What is claimed is:—

1. A secondary cell, comprising a plate and a separator comprising a corrugated sheet, said separator extending across and covering the face of said plate, said sheet having in its corrugated portion a multiplicity of perforations, the area of said perforations being not substantially less than the area of the face of said plate opposite said separator.

2. A secondary cell, comprising a plate and a separator comprising a corrugated sheet, said separator extending across and covering the face of said plate, said sheet having in its corrugated portion a multiplicity of perforations, the area of said perforations being larger than the area of the face of said plate opposite said separator.

3. A secondary cell, comprising a plate and a separator comprising a corrugated sheet, said separator extending across and covering the face of said plate, said sheet having in its corrugated portion a multiplicity of perforations, the area of said perforations being not substantially less than the area of the face of said plate opposite said separator, said plate being corrugated, the bends being curved, and the parts between bends being substantially parallel.

4. A secondary cell, comprising a plate and a unitary separator having a perforated corrugated portion extending across one face of said plate, and side portions adapted to embrace and insulate the two sides of said plate.

5. A secondary cell, comprising a plate and a unitary separator having a perforated corrugated portion extending across one face of said plate, and side portions adapted to embrace and insulate the two sides of said plate, said separator being resilient crosswise, whereby said separator can be extended and the side portions sprung over the sides of said plate.

6. A separator for plates in secondary cells, comprising a corrugated sheet adapted to cover the face of a plate, said sheet having in its corrugated portion, a multiplicity of perforations therein, the area of said perforations being not substantially less than an area measured by its width and height.

7. A separator for plates in secondary cells comprising a corrugated sheet adapted to cover the face of a plate, said corrugations having curved or angular bends, whereby a contact in the nature of a line contact is made with a cell plate, said sheet having its corrugated portion perforated between the bends in a plane crossing the planes limiting the tips of the corrugations, whereby a smooth surface is left at the bends.

8. A separator for plates in secondary cells comprising a corrugated sheet adapted to cover the face of a plate, said corrugations having curved or angular bends, whereby a contact in the nature of a line contact is made with a cell plate, the portions of the corrugations between bends being parallel, whereby said parallel portions resist crushing stresses transmitted by the plate in a substantially direct line, said sheet having its corrugated portion perforated in the parallel parts of the corrugations.

9. A separator for plates in secondary cells comprising a corrugated sheet adapted to cover the face of a plate, said corrugations having curved or angular bends, whereby a contact in the nature of a line contact is made with a cell plate, the portions of the corrugations between bends being parallel, whereby said parallel portions resist crushing stresses transmitted by the plate in a substantially direct line, said sheet having its corrugated portion perforated in the parallel parts of the corugations, the area of said perforations being not substantially less than the area of the face of the plate opposite said separator.

10. A separator for plates in secondary cells comprising a corrugated sheet adapted to cover the face of a plate, said corrugations having curved or angular bends, whereby a contact in the nature of a line contact is made with a cell plate, the portions of the corrugations between bends being parallel, whereby said parallel portions resist crushing stresses transmitted by the plate in a substantially direct line, said sheet having its corrugated portion perforated in the parallel parts of the corrugations, the area of said perforations being larger than the area of the face of the plate opposite said separator.

11. A separator for plates in secondary cells comprising a corrugated sheet, said corrugations having curved or angular bends, whereby a contact in the nature of a line contact is made with a cell plate, the portions of the corrugations between bends being parallel, whereby said parallel portions resist crushing stresses transmitted by the plate in a substantially direct line, said separator having hooked side portions, said hooks both projecting from the separator in the same direction, whereby to embrace the opposite sides of one plate.

12. A separator having a perforated corrugated body portion and hooked side portions, said hooks both projecting from the separator in the same direction, whereby to embrace the opposite side edges of one plate.

In witness whereof, we have hereunto signed our names.

THOMAS A. CAMPBELL.
JOHN W. DAMON.
AUSTIN B. STEWART.